United States Patent
Sakurai et al.

(10) Patent No.: US 11,420,421 B2
(45) Date of Patent: Aug. 23, 2022

(54) GLASS SHEET COMPOSITE, AND DIAPHRAGM

(71) Applicant: AGC Inc., Chiyoda-ku (JP)

(72) Inventors: Kento Sakurai, Tokyo (JP); Jun Akiyama, Tokyo (JP); Daisuke Uchida, Tokyo (JP); Shinya Tahara, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 282 days.

(21) Appl. No.: 16/822,074

(22) Filed: Mar. 18, 2020

(65) Prior Publication Data

US 2020/0223187 A1 Jul. 16, 2020

Related U.S. Application Data

(63) Continuation of application No. PCT/JP2018/037119, filed on Oct. 3, 2018.

(30) Foreign Application Priority Data

Oct. 4, 2017 (JP) .............................. JP2017-194639

(51) Int. Cl.
*B32B 17/06* (2006.01)
*C03C 27/06* (2006.01)
*H04R 7/08* (2006.01)

(52) U.S. Cl.
CPC .............. *B32B 17/06* (2013.01); *C03C 27/06* (2013.01); *H04R 7/08* (2013.01); *B32B 2307/10* (2013.01);
(Continued)

(58) Field of Classification Search
CPC ................ H04R 7/08; H04R 2307/023; B32B 2307/10; B32B 17/06; C03C 27/06
See application file for complete search history.

(56) References Cited

U.S. PATENT DOCUMENTS 6,453,050 B1 9/2002 Ogura et al.
2002/0186860 A1 12/2002 Ogura et al.
(Continued)

FOREIGN PATENT DOCUMENTS

CN 105096778 A 11/2015
EP 1 850 633 A1 10/2007
(Continued)

OTHER PUBLICATIONS

International Search Report dated Dec. 25, 2018 in PCT/JP2018/037119 filed Oct. 3, 2018, 1 page.
(Continued)

*Primary Examiner* — Sunita Joshi
(74) *Attorney, Agent, or Firm* — Oblon, McClelland, Maier & Neustadt, L.L.P.

(57) ABSTRACT

A glass sheet composite includes a first glass sheet, a second sheet disposed opposite the first glass sheet, and a liquid layer formed by sealing up a liquid between the first glass sheet and the second sheet, in which the glass sheet composite has a plurality of vibration areas that are independent of each other in a plan view. The glass sheet composite is a diaphragm including at least one vibrator disposed on one side or both sides of the glass sheet composite. The glass sheet composite enables independent vibration at each of the vibration areas, and enables not only stereophonic or multiphonic reproduction but also local reproduction to be performed along with images. Since the diaphragm includes a vibrator, this diaphragm is excellent in sound reproduction.

18 Claims, 7 Drawing Sheets

(52) U.S. Cl.
CPC .... *B32B 2315/08* (2013.01); *H04R 2307/023* (2013.01)

(56) References Cited

U.S. PATENT DOCUMENTS

| | | |
|---|---|---|
| 2008/0019544 A1 | 1/2008 | Ogura et al. |
| 2015/0341714 A1 | 11/2015 | Ahn et al. |
| 2019/0116406 A1 | 4/2019 | Ahn et al. |

FOREIGN PATENT DOCUMENTS

| | | | |
|---|---|---|---|
| JP | 5-227590 A | 9/1993 | |
| JP | 6-325868 A | 11/1994 | |
| JP | 2001-16692 A | 1/2001 | |
| JP | 2003-125475 A | 4/2003 | |
| JP | 2009-100223 A | 5/2009 | |
| JP | 2015-219528 A | 12/2015 | |
| WO | WO 2016/085615 A1 | 6/2016 | |
| WO | WO-2017175682 A1 * | 10/2017 | ............... B32B 1/00 |

OTHER PUBLICATIONS

Mal, O. et al., "A Novel Glass Laminated Structure for Flat Panel Loudspeakers," 124$^{th}$ Audio Engineering Society Convention , May 17-20, 2008, pp. 1-6.
Extended European Search Report dated May 28, 2021 in European Patent Application No. 18864197.1, 7 pages.

* cited by examiner

Fig. 7

|  | COMPARATIVE EXAMPLE | TEST EXAMPLE 1 | TEST EXAMPLE 2 |
|---|---|---|---|
| KIND | SINGLE GLASS SHEET | GLASS SHEET COMPOSITE | GLASS SHEET COMPOSITE |
| PARTITIONING INTO VIBRATION AREAS | — | DIVIDED INTO TWO AREAS | DIVIDED INTO EIGHT AREAS |
| LR MODE REPRODUCTION | POOR | EXCELLENT | GOOD |

GLASS SHEET COMPOSITE, AND DIAPHRAGM

TECHNICAL FIELD

The present invention relates to a glass sheet composite and a diaphragm.

BACKGROUND ART

A cone paper or resin has been generally used as a diaphragm for loudspeakers or microphones. Such a material has a high loss coefficient, vibration due to resonance hardly occurs therein, and thus, is thought to have good sound reproduction performance in the audible range.

However, since the acoustic velocity is low in any of these materials, when a high frequency causes the material excitation, vibration of the material is less likely to follow the acoustic wave frequency, and divided vibration readily occurs. It is therefore difficult to output a desired sound pressure particularly in a high-frequency range.

In recent years, the range required to be reproduced for a high-resolution sound source, etc. is a high-frequency region of 20 kHz or more. This region is a range supposed to be poorly audible by human ear, but it is preferred that the sonic vibration in the range above can be reproduced with high fidelity, because it provides a stronger emotional impact to a listener, for example, it makes the listener feel a strong realistic sensation.

Accordingly, it may be conceived that a material having a high velocity of sound propagation therethrough, such as a metal, ceramic, or glass, is used in place of the cone paper or resin.

CITATION LIST

Patent Literature

Patent Document 1: JP-A-5-227590

Non-Patent Literature

Non-Patent Document 1: Olivier Mal et. al., "A Novel Glass Laminated Structure for Flat Panel Loudspeakers", AES Convention 124, 7343.

SUMMARY OF INVENTION

Technical Problem

Known as diaphragms for loudspeakers are a diaphragm including one glass sheet (Patent Document 1) and a laminated glass having a butyral-based resin layer between two glass sheets (Non-Patent Document 1).

When a loudspeaker of a flat shape such as those shown above is made to vibrate, a vibrator is bonded to a sheet to provide vibration. It is, however, difficult to use such a loudspeaker to perform two-channel stereophonic reproduction or multiphonic reproduction involving a larger number of channels. Even when it is attempted to dispose two or more vibrators on a single sheet to perform stereophonic reproduction or multiphonic reproduction, different vibration modes may sometimes interfere with each other in the single sheet.

Accordingly, an object of the present invention is to provide a glass sheet composite and a diaphragm which are capable of performing excellent stereophonic reproduction or multiphonic reproduction, etc.

Solution to Problem

[1] The glass sheet composite of the present invention includes a first glass sheet, a second sheet disposed opposite the first glass sheet, and a liquid layer formed by sealing up a liquid between the first glass sheet and the second sheet, in which the glass sheet composite having a plurality of vibration areas that are independent of each other in a plan view.

[2] The glass sheet composite according to [1], in which the plurality of vibration areas have area equal to each other.

[3] The glass sheet composite according to [1] or [2], in which the liquids of the liquid layers in the vibration areas have been hermetically sealed up by partitioning parts that are formed at edges of the vibration areas, and define boundaries between the vibration areas.

[4] The glass sheet composite according to [1] or [2], in which the liquid of the liquid layer in one of at least two adjacent vibration areas among said vibration areas and the liquid of the liquid layer in the other of the two adjacent vibration areas are in contact with each other in the partitioning part which defines a boundary between the two vibration areas, in a state of being mutually flowable.

[5] The glass sheet composite according to [3] or [4], in which the first glass sheet and the second sheet have been fixed to each other, with a seal material interposed therebetween, the partition parts being made of the same material as the seal material.

[6] The glass sheet composite according to [3] or [4], in which the first glass sheet and the second sheet have been fixed to each other, with a seal material interposed therebetween, the partition parts being made of a material having a lower adhesion strength than the seal material.

[7] The glass sheet composite according to any one of [1] to [6], in which the liquid of the liquid layer in at least two of the vibration areas have different ingredient from each other.

The diaphragm of the present invention includes the glass sheet composite and at least one vibrator disposed on one or both surfaces of the glass sheet composite.

Advantageous Effects of Invention

The glass sheet composite of the present invention enables independent vibration at each of the vibration areas, and enables not only stereophonic or multiphonic reproduction but also local reproduction to be performed along with images. Since the diaphragm includes a vibrator, this diaphragm is excellent in sound reproduction.

BRIEF DESCRIPTION OF DRAWINGS

FIG. 1A shows a first embodiment and FIG. 1B shows a second embodiment.

FIG. 2A indicates Example 1, FIG. 2B indicates Example 2, FIG. 2C indicates Example 3, and FIG. 2D indicates Example 4.

FIG. 3A indicates Example 5, FIG. 3B indicates Example 6, FIG. 3C indicates Example 7, and FIG. 3D indicates Example 8.

FIG. 4A indicates Example 9, FIG. 4B indicates Example 10, FIG. 4C indicates Example 11, and FIG. 4D indicates Example 12.

FIG. 5A indicates Example 13 and FIG. 5B indicates Example 14.

FIG. 7 is a table showing the results of a test in which glass sheet composites according to the present invention were examined for sound reproduction performance.

DESCRIPTION OF EMBODIMENTS

Figure 1A:
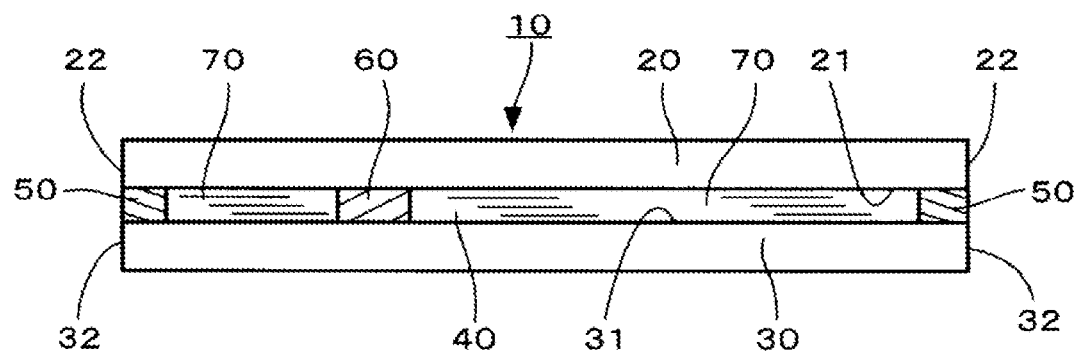
FIGS. 1A and 1B are cross-sectional views showing examples of the glass sheet composite according to the present invention.

Details and other features of the present invention are described below based on embodiments of the present invention. Here, in the following drawings, the same or corresponding reference numeral is assigned to the same or corresponding members or parts, and duplicated description is thereby omitted. In addition, unless otherwise specified, the drawings are not intended to show a relative ratio among members or parts. Accordingly, specific dimensions may be properly selected in the context of the following non-limiting embodiments.

Furthermore, "-" indicating a numerical range in the present description is used in the sense of including the numerical values set forth before and after the "-" as a lower limit value and an upper limit value.

(Outline of the Glass Sheet Composite)

The glass sheet composite according to the present invention is a glass sheet composite which includes a first glass sheet, a second sheet disposed opposite the first glass sheet, and a liquid layer formed by sealing up a liquid between the first glass sheet and the second sheet, and which has a plurality of vibration areas that are independent of each other in a plan view, i.e., that can vibrate independently of each other.

The plurality of vibration areas that can vibrate enables stereophonic or multiphonic sound reproduction. Finely dividing vibration areas enables local sound selection in the glass sheet composite, and enables reproduction that allows image and sound to be linked simultaneously. For example, a sound from a specific person or object in an image can be locally produced from the position thereof within the image. Especially when the plurality of vibration areas have area equal to each other, this glass sheet composite is suitable for stereophonic reproduction.

The liquid layer is surrounded by a seal material, and the seal material is used for fixing the first glass sheet and the second sheet to each other. This configuration prevents the liquid layer held inside the seal material from leaking out and provides the glass sheet composite with improved quality.

It is preferable that the edge surfaces of the first glass sheet and second sheet and the edge surfaces of the seal material form a single surface at each edge. Thus, since the edge surfaces of the sheets and the edge surfaces of the seal material are flush with each other, a glass sheet composite having a preferable appearance can be provided.

The glass sheet composite may be one in which at least some of the edge surfaces of the periphery of the first glass sheet and/or the second sheet have a tapered surface and an edge surface of the seal material has a curved surface which continues to the tapered surface of the sheet. Because of this configuration, sharp angles in edge portions of the first glass sheet or second sheet can be removed to attain safety, and the area of contact between the seal material and the sheet is increased, making it possible to improve the sealing performance.

The liquids of the liquid layers in the vibration areas may have been hermetically sealed up by partitioning parts formed at edges of the vibration areas and defining boundaries with other vibration areas. The partitioning parts may be made of the same material as the seal material or may be made of a material having a lower adhesion strength than the seal material.

By providing partitioning parts, the liquid layer can be partitioned without gaps, and the vibration area can be clearly partitioned, the independence of vibration in each vibration area can be increased, the bonding area can be increased, and the adhesion strength between the first glass sheet and the second sheet is improved.

Partitioning parts may be disposed so that the liquids of the liquid layers in adjacent areas are not completely separated from each other and that the liquid layers in the vibration areas lie in fixed positions while being kept in the state of being separated from each other to some degree. Namely, the liquid of the liquid layer in one of at least two adjacent vibration areas and the liquid of the liquid layer in the other of the two adjacent vibration areas are in contact with each other in the partitioning part which defines a boundary between the two vibration areas, while being mutually flowable.

For increasing the transmittance of the glass sheet composite, it is useful to make the liquid layer to have refractive index that matches with that of the seal material. Specifically, the closer the refractive index of the liquid layer held between the first glass sheet and the second sheet to the refractive index of the seal material (including the partitioning parts), the more reflection or interference at the boundary therebetween is prevented and the less reduction in the visibility through the glass sheet occurs. This configuration is hence preferred. The difference in refractive index between the liquid layer and the seal material (including the partitioning parts) is preferably 0.015 or less, more preferably 0.01 or less.

In case where the sealed liquid layer (liquid ingredient) and the seal material (including the partitioning parts) are different substances, have a difference in refractive index therebetween and, are disposed over the (whole) viewing area of a display, which is one of the examples of the glass sheet composite, then the boundary between the two is noticed due to the light transmitted from the back side and the visibility is disturbed.

In the glass sheet composite of the present invention, by reducing the difference in refractive index between the two to a given value or lower, the boundary between the two can be made difficult to notice. Even when the liquid layer and the seal material are disposed over the (whole) viewing area of the glass sheet composite, the visibility is not disturbed. In addition, it is no longer necessary to dispose a frame for hiding the boundary, and a frame-less glass sheet composite is more easily rendered possible. It is hence possible to not only improve the acoustic characteristics but also attain improvements in design and freedom of design and a cost reduction.

Meanwhile, when the glass sheet composite has a high linear transmittance, this glass sheet composite can be applied as a light-transmitting member. Accordingly, the glass sheet composite has a visible-light transmittance, as determined in accordance with Japanese Industrial Standards (JIS R3106-1998), of preferably 60% or higher, more preferably 65% or higher, still more preferably 70% or higher. Examples of applications for the light-transmitting member include transparent loudspeakers, transparent microphones, and opening members for buildings or vehicles.

It is preferable that the glass sheet composite according to the present invention has a loss coefficient at 25° C. of $1 \times 10^{-2}$ or higher and that the at least one glass sheet has a sheet-thickness-direction longitudinal wave acoustic velocity of $4.0 \times 10^3$ m/s or higher. Having a high loss coefficient means that the vibration damping capacity is high.

As for the loss coefficient, a value calculated by a half-width method is used. Denoting f as the resonant frequency of a material and W as a frequency width at a point decreased by −3 dB from the peak value of the amplitude h (namely, the point of (maximum amplitude)−3 [dB]), the loss coefficient is defined as a value represented by {W/f}.

In order to prevent the resonance, the loss coefficient may be increased, namely, this means that the frequency width W becomes relatively large with respect to the amplitude h and the peak becomes broader.

Loss coefficient is a value inherent in a material, etc. For example, in the case of a glass sheet alone, the loss coefficient varies depending on the composition, relative density, etc. thereof. Loss coefficient can be determined by a dynamic modulus test such as a resonance method.

The term "longitudinal wave acoustic velocity" means a velocity at which a longitudinal wave propagates in an object. The longitudinal wave acoustic velocity can be measured by the ultrasonic pulse method described in Japanese Industrial Standards (HS-R1602-1995).

(Liquid Layer)

Since the glass sheet composite according to the present invention includes a layer made of a liquid (liquid layer) disposed between at least two sheets (at least a pair of sheets), a high loss coefficient can be achieved. In particular, the loss coefficient can be made larger by controlling the viscosity and surface tension of the liquid layer to fall within suitable ranges. This is considered attributed to the fact that, unlike the case of disposing a pair of sheets with an adhesive layer interposed therebetween, the pair of sheets is not fixed and continues maintaining the vibration characteristics of each individual sheet. For the purpose of simplifying the explanation, the first glass sheet and the second sheet are each referred to as "sheet".

The liquid layer preferably has a viscosity coefficient at 25° C. of $1 \times 10^{-4}$ to $1 \times 10^3$ Pa·s and a surface tension at 25° C. of 15-80 mN/m. In case where the viscosity thereof is too low, this liquid layer is less apt to transmit vibrations. In case where the viscosity thereof is too high, the two sheets respectively on both sides of the liquid layer are fixed to exhibit a vibration behavior as one sheet, becoming less effective in damping vibration due to resonance. Meanwhile, in case where the surface tension thereof is too low, the sheets have reduced adhesion therebetween and are less apt to transmit vibrations. In case where the surface tension thereof is too high, the two sheets respectively on both sides of the liquid layer are apt to be fixed to exhibit a vibration behavior as one sheet, becoming less effective in damping vibration due to resonance.

The liquid layer has a viscosity coefficient at 25° C. of more preferably $1 \times 10^{-3}$ Pa·s or higher, still more preferably $1 \times 10^{-2}$ Pa·s or higher. The liquid layer preferably has a viscosity coefficient at 25° C. of more preferably $1 \times 10^2$ Pa·s or less, still more preferably $1 \times 10$ Pa·s or less.

The liquid layer has a surface tension at 25° C. of more preferably 17 mN/m or higher, still more preferably 30 mN/m or higher.

The viscosity coefficient of the liquid layer can be measured with a rotational viscometer, etc. The surface tension of the liquid layer can be measured by a ring method, etc.

In case where the liquid layer has too high a vapor pressure, some of this liquid layer may vaporize, making the glass sheet composite unable to perform its function. The liquid layer hence has a vapor pressure at 25° C. and 1 atm of preferably $1 \times 10^4$ Pa or less, more preferably $5 \times 10^3$ Pa or less, still more preferably $1 \times 10^3$ Pa or less.

The liquid layer having smaller thickness is preferred from the standpoints of enabling the glass sheet composite to retain high rigidity and of transmitting vibrations. Specifically, when the total thickness of the two sheets is 1 mm or less, the liquid layer has a thickness of preferably 1/10 or less, more preferably 1/20 or less, still more preferably 1/30 or less, yet still more preferably 1/50 or less, even still more preferably 1/70 or less, even yet still more preferably 1/100 or less, of the total thickness of the two sheets.

In the case where the total thickness of the two sheets exceeds 1 mm, the liquid layer has a thickness of preferably 100 μm or less, more preferably 50 μm or less, still more preferably 30 μm or less, yet still more preferably 20 μm or less, even still more preferably 15 μm or less, even yet still more preferably 10 μm or less.

A lower limit of the thickness of the liquid layer is preferably 0.01 μm or larger from the standpoints of production efficiency and durability.

It is preferable that the liquid layer is chemically stable and does not react with either of the two sheets lying respectively on both sides of the liquid layer. The term "chemically stable" means, for example, that the liquid layer is less apt to be altered (deteriorated) by light irradiation and undergoes none of solidification, vaporization, decomposition, discoloration, chemical reaction with the sheets, and the like at least in the temperature range of −20° C. to 70° C.

Examples of ingredients usable as the liquid layer include water, oils, organic solvents, liquid polymers, ionic liquids, and mixtures of two or more of these.

More specific examples thereof include propylene glycol, dipropylene glycol, tripropylene glycol, straight silicone oils (dimethyl silicone oil, methyl phenyl silicone oil, and methyl hydrogen silicone oil), modified silicone oils, acrylic-acid-based polymers, liquid polybutadiene, glycerin paste, fluorochemical solvents, fluororesins, acetone, ethanol, xylene, toluene, water, mineral oil, and mixtures of two or more of these. It is preferable that the liquid layer includes at least one member selected from the group consisting of a dimethyl silicone oil, a methyl phenyl silicone oil, a methyl hydrogen silicone oil, and modified silicone oils, among those. It is more preferable that the liquid layer includes propylene glycol or a silicone oil as a main component.

The liquid layer may be configured so that the vibration areas differ from each other in the ingredient of the liquid layer. Different ingredients can be selected from among the ingredients shown above, for the respective vibration areas.

Also usable as the liquid layer besides those ingredients is a slurry containing particles dispersed therein. Although the liquid layer preferably is a homogeneous fluid from the standpoint of improving the loss coefficient, the slurry is effective in the case of imparting design attractiveness or a function, such as coloration or fluorescence, to the glass sheet composite.

The content of the particles in the liquid layer is preferably 0-10 vol %, more preferably 0-5 vol %.

The particles have a particle diameter of preferably 10 nm to 10 μm, more preferably 0.5 μm or less, from the standpoint of preventing sedimentation.

The liquid layer may contain a fluorescent material from the standpoint of imparting design attractiveness or a function. For example, this liquid layer may be either a slurry liquid layer which contains a particulate fluorescent material dispersed therein or a homogeneous liquid layer in which a liquid fluorescent material has been mixed. Accordingly, the optical function such as absorbing light and emitting light, can be imparted to the glass sheet composite.

(Seal Material and Partitioning Parts)

The seal material may be in close contact with the edge surface of one of the two sheets, an edge surface of the liquid layer, and a main surface of the other sheet. In the case where the edge surface of one of the sheets and the edge surface of the liquid layer are perpendicular to the main surface of the other sheet, the seal material, in a cross-sectional view, has an L-shaped contour. This configuration improves the strength of the glass sheet composite.

The seal material preferably has a tapered surface. This seal material can produce the same effect as that of processing the edge surface of a sheet.

The seal material is disposed on edge portions of the first glass sheet and second sheet, while partitioning parts are suitably disposed in order to form a plurality of vibration areas in the region surrounded by the seal material.

The seal material and the partitioning parts preferably include at least one member selected from the group consisting of a poly(vinyl acetate)-based material, a poly(vinyl chloride)-based material, a poly(vinyl al cohol)-based material, an ethylene-copolymer-based material, a poly(acrylate)-based material, a cyanoacrylate-based material, a saturated-polyester-based material, a polyamide-based material, a linear-polyimide-based material, a melamine resin, a urea resin, a phenolic resin, an epoxy-based material, a polyurethane-based material, an unsaturated-polyester-based material, a reactive acrylic material, a rubber-based material, a silicone-based material, and a modified-silicone-based material. The seal material and the partitioning parts may be made of the same material or different materials, and the partitioning parts may be selected from among materials having a lower adhesion strength than the seal material.

(First Glass Sheet and Second Sheet)

The glass sheet composite according to the present invention includes at least two (at least a pair of) sheets disposed so as to sandwich the liquid layer therebetween. At least one of the two sheets is a glass sheet. In this configuration, when either of the sheets resonates, the presence of the liquid layer can prevent the other sheet from resonating or can damp the resonant vibration of the other sheet. The glass sheet composite can hence have a higher loss coefficient than single glass sheets.

It is preferable that, of one of the two sheets constituting the pair of sheets, one sheet and the other sheet have different peak top values of resonant frequency. It is more preferable that the ranges of resonant frequency of the two sheets do not overlap each other. However, even though the range of resonant frequency of one sheet and that of the other sheet overlap each other or the two sheets have the same peak top value, the presence of the liquid layer prevents the resonance of one sheet from causing synchronous vibration to the other sheet and thereby reduces the resonance to some degree. A high loss coefficient can hence be obtained as compared with the case of single glass sheets.

More specifically, denoting Qa and wa respectively as the resonant frequency (peak top) and the half-width of resonance amplitude of one of the sheets and denoting Qb and wb respectively as the resonant frequency (peak top) and the half-width of resonance amplitude of the other sheet, it is preferable that the relationship represented by the following formula (1) is satisfied.

$$(wa+wb)/4 < |Qa-Qb| \tag{1}$$

The larger the value of the left side of formula (1), the larger the difference ($|Qa-Qb|$) in resonant frequency between the two sheets and the higher the loss coefficient. It is hence preferable that the two sheets have such properties.

Accordingly, it is more preferable that the following formula (2) is satisfied, and it is still more preferable that the following formula (3) is satisfied.

$$(wa+wb)/2 < |Qa-Qb| \tag{2}$$

$$(wa+wb)/1 < |Qa-Qb| \tag{3}$$

The resonant frequency (peak top) and half-width of resonance amplitude of each sheet can be determined by the same method as the loss coefficient of the glass sheet composite.

It is preferred that the mass difference between one sheet and the other sheet is smaller, and it is more preferred that there is no mass difference therebetween. In cases when the sheets have different mass, the resonance of the lighter sheet can be reduced by the heavier sheet but it is difficult to reduce the resonance of the heavier sheet by the lighter sheet. Namely, if the mass ratio is imbalanced, vibrations due to resonance cannot theoretically be mutually eliminated because of the difference in inertial force.

The mass ratio between the two sheets which is represented by (one sheet)/(the other sheet) is preferably 0.1-10 (from 1/10 to 10/1), more preferably 0.5-2 (from 5/10 to 10/5), even more preferably 1.0 (10/10; mass difference, 0).

The smaller the thicknesses of one sheet and the other sheet, the more likely the sheets are to adhere to each other with the liquid layer interposed therebetween and the smaller the amount of energy necessary for vibrating the sheets. Hence, for use in diaphragm applications as in loudspeakers, the smaller the sheet thicknesses, the better. Specifically, the sheet thickness of each of the two sheets is preferably 15 mm or less, more preferably 10 mm or less, still more preferably 5 mm or less, yet still more preferably 3 mm or less, even still more preferably 1.5 mm or less, even yet still more preferably 0.8 mm or less. Meanwhile, if the thickness is too small, the impact of surface defects of the sheets becomes noticeable, cracks are likely to occur, and strengthening treatment becomes difficult. Hence, the thickness thereof is preferably 0.01 mm or larger, more preferably 0.05 mm or larger.

For use in opening member applications in buildings or vehicles, which are reduced in the occurrence of an abnormal noise attributed to a resonance phenomenon, the thicknesses of one sheet and the other sheet are each preferably 0.5-15 mm, more preferably 0.8-10 mm, still more preferably 1.0-8 mm.

It is preferable, for use in diaphragm applications, that one sheet and/or the other sheet has a high loss coefficient, because this enables the glass sheet composite to show enhanced vibration damping. Specifically, the loss coefficient at 25° C. of the sheet(s) is preferably $1\times10^{-4}$ or higher, more preferably $3\times10^{-4}$ or higher, still more preferably $5\times10^{-4}$ or higher. There is no particular upper limit, but the loss coefficient thereof is preferably $5\times10^{-3}$ or less from the standpoints of productivity and manufacturing cost. It is more preferable that both the one sheet and the other sheet have that loss coefficient.

The loss coefficient of each sheet can be determined by the same method as the loss coefficient of the glass sheet composite.

It is preferable, for use in diaphragm applications, that one sheet and/or the other sheet has a high longitudinal wave acoustic velocity in the sheet thickness direction, because the sound reproducibility in a high-frequency region is enhanced. Specifically, the longitudinal wave acoustic velocity of the sheet(s) is preferably $4.0\times10^3$ m/s or higher, more preferably $5.0\times10^3$ m/s or higher, still more preferably $6.0>10^3$ m/s or higher. There is no particular upper limit, but the longitudinal wave acoustic velocity thereof is preferably $7.0\times10^3$ m/s or less from the standpoints of sheet productivity and raw material cost. It is more preferable that both the one sheet and the other sheet satisfy that acoustic velocity.

The acoustic velocity of each sheet can be measured by the same method as the longitudinal wave acoustic velocity of the glass sheet composite.

In the glass sheet composite according to the present invention, at least one of the sheets is constituted of a glass sheet. The material of the second sheet is not limited, and use can be made of any of various non-glass sheets including a resin sheet made of a resin (referred to also as "organic-glass sheet"). From the standpoints of design attractiveness and processability, it is preferred to use a resinous sheet or a composite material thereof. Especially preferred is to use a resinous sheet made of an acrylic resin, a polyimide resin, a polycarbonate resin, a PET resin, or an FRP material.

In the case where at least one sheet is a glass sheet, this glass sheet has a composition not particularly limited. However, the contents of components thereof are, for example, preferably in the following ranges.

40-80 mass % $SiO_2$, 0-35 mass % $Al_2O_3$, 0-15 mass % $B_2O_3$, 0-20 mass % MgO, 0-20 mass % CaO, 0-20 mass % SrO, 0-20 mass % BaO, 0-20 mass % $Li_2O$, 0-25 mass % $Na_2O$, 0-20 mass % $K_2O$, 0-10 mass % $TiO_2$, and 0-10 mass % $ZrO_2$. These components account for at least 95 mass % of the entire glass.

More preferably, the glass sheet has the composition including the following components in amounts within the following ranges. 55-75 mass % $SiO_2$, 0-25 mass % $Al_2O_3$, 0-12 mass % $B_2O_3$, 0-20 mass % MgO, 0-20 mass % CaO, 0-20 mass % SrO, 0-20 mass % BaO, 0-20 mass % $Li_2O$, 0-25 mass % $Na_2O$, 0-15 mass % $K_2O$, 0-5 mass % $TiO_2$, and 0-5 mass % $ZrO_2$. These components account for at least 95 mass % of the entire glass.

A specific modulus is a value obtained by dividing the Young's modulus by the density, and the higher the specific modulus of the glass sheet, the higher the rigidity of the glass sheet. Specifically, the glass sheet has the specific modulus of preferably $2.5\times10^7$ m$^2$/s$^2$ or higher, more preferably $2.8\times10^7$ m$^2$/s$^2$ or higher, still more preferably $3.0\times10^7$ m$^2$/s$^2$ or higher. Although there is no particular upper limit, the specific modulus thereof is preferably $4.0\times10^7$ m$^2$/s$^2$ or less from the standpoint of formability during glass production. The Young's modulus can be determined by the ultrasonic pulse method described in Japanese Industrial Standards (JIS-R1602-1995).

The lower the specific gravity of each glass sheet, the smaller the amount of energy necessary for vibrating the glass sheet. Specifically, the glass sheet has the specific gravity of preferably 2.8 or less, more preferably 2.6 or less, still more preferably 2.5 or less. Although there is no particular lower limit, the specific gravity thereof is preferably 2.2 or higher.

(Glass Sheet Composite)

It is possible to color at least one of the sheets and/or the liquid layer, which constitute the glass sheet composite. This is useful in the case where design attractiveness or a function, such as IR cut, UV cut, or privacy glass, is desired to be given to the glass sheet composite.

At least one glass sheet suffices for the sheets constituting the glass sheet composite, but two or more glass sheets may be used. In this case, glass sheets, all of which have different compositions, may be used or glass sheets, all of which have the same composition, may be used. Glass sheets having the same composition may be used in combination with a glass sheet having a different composition. Among others, it is preferred to use two or more kinds of glass sheets having different compositions, from the standpoint of vibration damping.

Similarly, as to the mass and thickness, the glass sheets may be all different, may be all the same, or some may be different. Above all, from the standpoint of vibration damping, all of the constituent glass sheets preferably have the same mass.

A physically strengthened glass sheet or a chemically strengthened glass sheet may be used as at least one of the glass sheets constituting the glass sheet composite. This is useful for preventing the glass sheet composite from breaking. When an increase in the strength of the glass sheet composite is desired, it is preferable that a physically strengthened glass sheet or a chemically strengthened glass sheet is used as the glass sheet located in an outermost surface of the glass sheet composite, and it is more preferable that all of the constituent glass sheets are each a physically strengthened glass sheet or a chemically strengthened glass sheet.

From the standpoint of increasing the longitudinal wave acoustic velocity and the strength, it is also useful to use crystallized glass or phase-separated glass as a glass sheet. Especially when an increase in the strength of the glass sheet composite is desired, it is preferred to use the crystallized glass or phase-separated glass as the glass sheet located in an outermost surface of the glass sheet composite.

A coating or a film may be formed on at least one outermost surface of the glass sheet composite, so long as the effects of the present invention are not impaired. Formation of a coating or attachment of a film is suitable for scratch protection, etc.

It is preferred that the coating or film has the thickness of ⅕ or less of the sheet thickness of the surface glass sheet. The coating and the film can be conventionally known ones. Examples of the coating include a water-repellent coating, a hydrophilic coating, a water sliding coating, an oil-repellent coating, a light reflection preventive coating, a heat shielding coating, and a highly reflective coating. Examples of the film include a shatterproof film for glass, a color film, a UV cut film, an IR cut film, a heat-shielding film, an electromagnetic wave shielding film, and a screen film for projectors.

The shape of the glass sheet composite can be appropriately designed in accordance with applications, and may be a flat plate-like shape or a curved surface shape. The shape thereof may be a rectangular, triangular, circular, or polygonal shape, etc. in a plan view.

In order to raise the output sound pressure level in a low-frequency range, the glass sheet composite can be made to have a structure including an enclosure or a baffle plate. Although the material of the enclosure or baffle plate is not particularly limited, it is preferable to use the glass sheet composite of the present invention.

A frame may be provided to at least one outermost surface of the glass sheet composite so long as the effects of the present invention are not impaired. The frame is useful, for example, when it is desired to enhance the rigidity of the glass sheet composite or maintain a curved surface shape. As the material of the frame, a conventionally known material may be used. For example, use can be made of ceramics and single-crystal materials such as $Al_2O_3$, SiC, $Si_3N_4$, AlN, mullite, zirconia, yttria, and YAG, metal and alloy materials such as steel, aluminum, titanium, magnesium, and tungsten carbide, composite materials such as FRPs, resin materials such as acrylics and polycarbonates, glass materials, and wood.

The frame to be used has a weight preferably 20% or less, more preferably 10% or less, of the weight of the glass sheet.

A seal member may be interposed between the glass sheet composite and the frame. Furthermore, at least some of an outer circumferential edge portion of the glass sheet composite may be sealed by a seal member which does not hinder the glass sheet composite from vibrating. As the seal members, use can be made of a highly elastic rubber, a resin, a gel, etc.

As the resin for the seal members, use can be made of acrylic, cyanoacrylate-based, epoxy-based, silicone-based, urethane-based, and phenolic resins. Examples of curing methods include one-pack type, two-pack mixing type, heat curing, ultraviolet curing, and visible light curing.

A thermoplastic resin (hot-melt bond) is also usable. Examples thereof include (ethylene/vinyl acetate)-based, polyolefin-based, polyamide-based, synthetic rubber-based, acrylic, and polyurethane-based resins.

As the rubber, use can be made of natural rubber, synthetic natural rubber, butadiene rubber, styrene-butadiene rubber, butyl rubber, nitrile rubber, ethylene-propylene rubber, chloroprene rubber, acrylic rubber, chlorosulfonated polyethylene rubber (Hypalon), urethane rubber, silicone rubber, fluororubber, ethylene-vinyl acetate rubber, epichlorohydrin rubber, polysulfide rubber (Thiokol), and hydrogenated nitrile rubber.

In case where the thickness t of each seal member is too small, sufficient strength is not ensured. In case where the thickness t thereof is too large, the seal member may hinder vibrations. Consequently, the seal member has the thickness of preferably 10 µm or larger and up to 5 times the overall thickness of the glass sheet composite, and more preferably 50 µm or larger and smaller than the overall thickness of the glass sheet composite.

At least some portions of the opposed surfaces of the sheets may be coated with the seal member in order to, for example, prevent separation at the interface between each sheet and liquid layer of the glass sheet composite, so long as the effects of the present invention are not impaired. In this case, the area of the seal member-coated portion is preferably 20% or less, more preferably 10% or less, still more preferably 5% or less, of the area of the liquid layer so as not to hinder vibrations.

In order to enhance the sealing performance, edge portions of each sheet can be processed into an appropriate shape. For example, edge portions of at least one of the sheets may be processed by C-chamfering (the sheet has a trapezoidal cross-sectional shape) or R-chamfering (the sheet has an approximately arc cross-sectional shape), thereby increasing the area of contact between the seal member and the sheet. Thus, the strength of adhesion between the seal member and the sheet can be enhanced.

(Diaphragm)

The diaphragm of the present invention preferably includes the glass sheet composite and a vibrator provided to the first glass sheet or second sheet.

The diaphragm can be made to function as a loudspeaker, a microphone, an earphone, or a casing's vibrating body or casing's speaker of a mobile device, etc. by disposing, for example, one or more vibration elements or vibration detection elements (vibrators) on one side or both sides of the glass sheet composite. In order to enhance the output sound pressure level, two or more vibration elements are preferably disposed on both sides of the glass sheet composite.

In general, the position of the vibrators with respect to the diaphragm is preferably the central portion of the glass composite, but since the material has a high acoustic velocity and a high damping performance, the vibrator may be disposed at an edge part of the glass sheet composite. Use of the diaphragm according to the present invention can facilitate reproduction of the sound in a high-frequency region that had been conventionally difficult to be reproduced. In addition, since size, shape, color and the like of the glass sheet composite can be freely selected, a design can be applied thereto, so that a diaphragm with excellent design can be obtained. Furthermore, by sampling sound or vibration by a sound collecting microphone or a vibration detector disposed on the surface or in the vicinity of the glass sheet composite and generating vibration of the same phase or reverse phase in the glass sheet composite, the sound or vibration sampled can be amplified or canceled.

At this time, in the case where the sound or vibration characteristics at the sampling point above are caused to undergo a change based on a certain acoustic transfer function in the course of propagating to the glass sheet composite, and in the case where an acoustic conversion transfer function is present in the glass sheet composite, the vibration can be accurately amplified or canceled by correcting the amplitude and phase of the control signal by means of a control filter. At the time of constructing the control filter above, for example, the least-square (LMS) algorithm can be used.

In a more specific configuration, for example, the glass sheet composite of the present invention is used as all or at least one of the glass sheets of a multi-layered glass. A structure is thus produced in which the vibration level of the sheet at the inflow side of a sonic vibration to be controlled or the sound pressure level of a space present between glasses is sampled and, after appropriate signal correction by a control filter, output to a vibration element on the glass sheet composite disposed at the outflow side of the sonic vibration.

This diaphragm can be utilized, for example, as a member for electronic devices, in a full-range loudspeaker, a loudspeaker for reproducing a low-pitched sound range of 15 Hz to 200 Hz, a loudspeaker for reproducing a high-pitched sound range of 10 kHz to 100 kHz, a large loudspeaker having a diaphragm area of 0.2 $m^2$ or more, a small loudspeaker having a diaphragm area of 3 $cm^2$ or less, a flat loudspeaker, a cylindrical loudspeaker, a transparent loudspeaker, a mobile device cover glass functioning as a loudspeaker, a TV display cover glass, a display outputting video signals and audio signals from the same surface, a loudspeaker for wearable displays, an electronic display device, and lighting equipment. In addition, the diaphragm can be used as a diaphragm or vibration sensor for headphones, earphones or microphones.

This diaphragm can be used as an interior vibration member of transport machinery such as vehicle, or as an in-vehicle/in-machine loudspeaker and can form, for example, a side-view mirror, a sun visor, an instrument panel, a dashboard, a ceiling, a door, or other interior panels, each functioning as a loudspeaker. In addition, such a member can also be made to function as a microphone and a diaphragm for active noise control.

With respect to other uses, the diaphragm can be used as a diaphragm for ultrasonic generators, a slider for ultrasonic motors, a low frequency generator, a vibrator for propagating sonic vibration in liquid, a water tank and a container each using the vibrator, a vibration element, a vibration detection element, and an actuator material for vibration damping equipment.

(Embodiments of the Glass Sheet Composite)

Figure 1B:
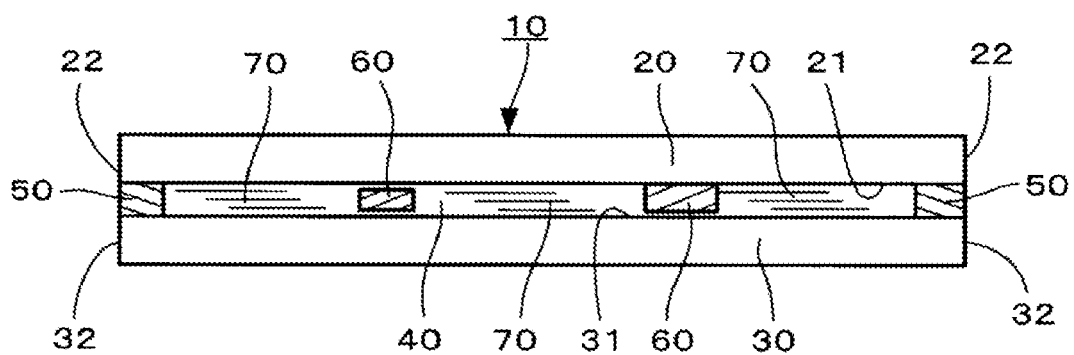
Figure 2A:
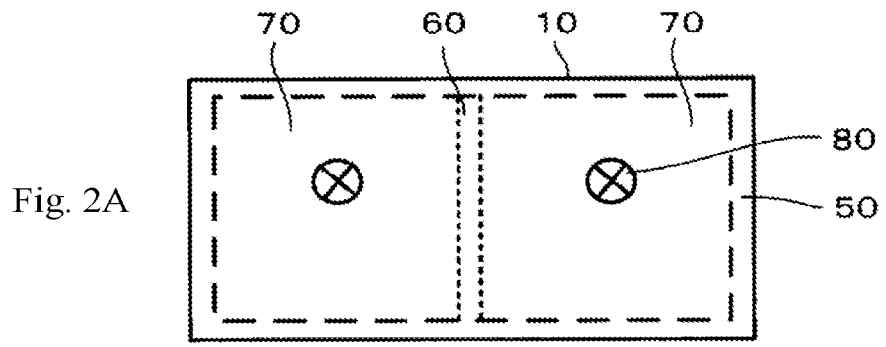
FIGS. 2A to 2D are plan views showing vibration areas of glass sheet composites according to the present invention.
Figure 2B:
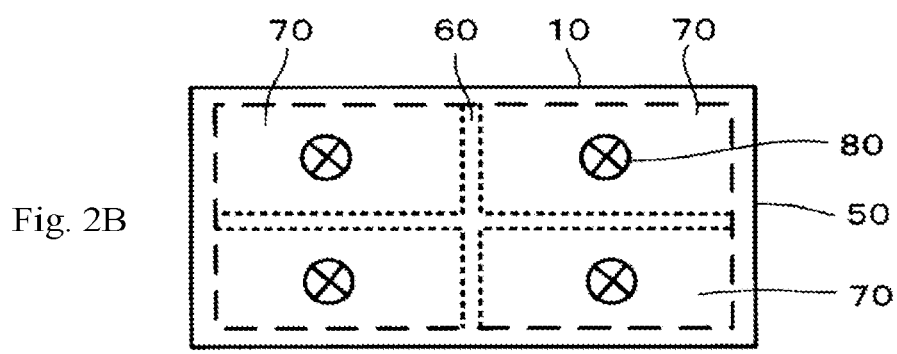
Figure 2C:
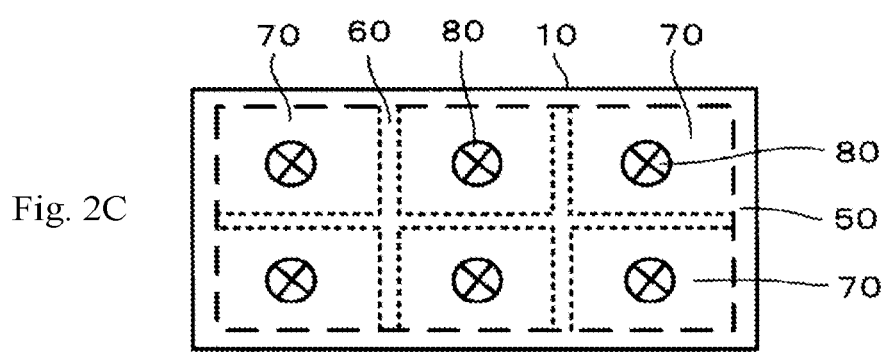
Figure 2D:
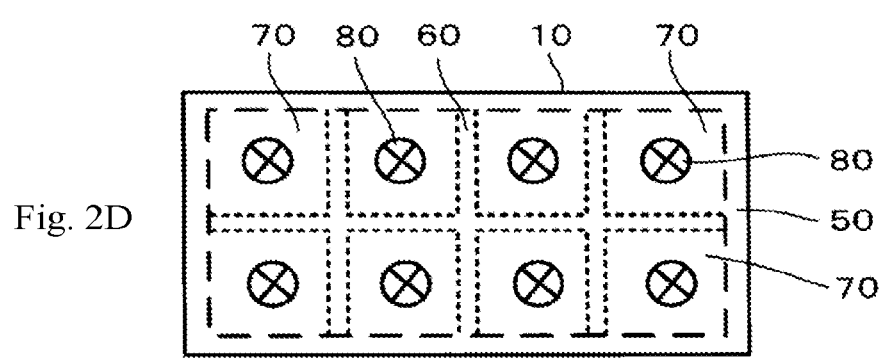
Figure 3A:
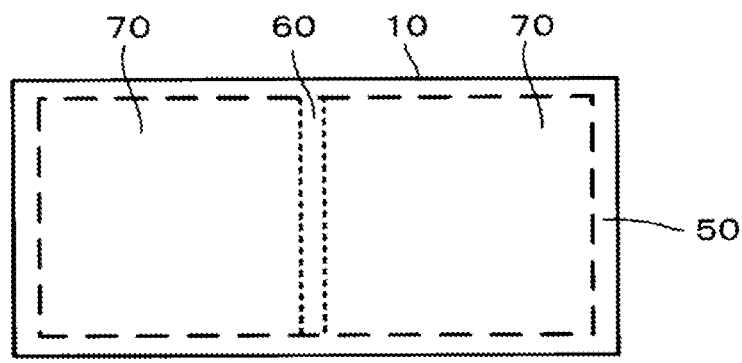
FIGS. 3A to 3D are plan views showing vibration areas of glass sheet composites according to the present invention.
Figure 3B:
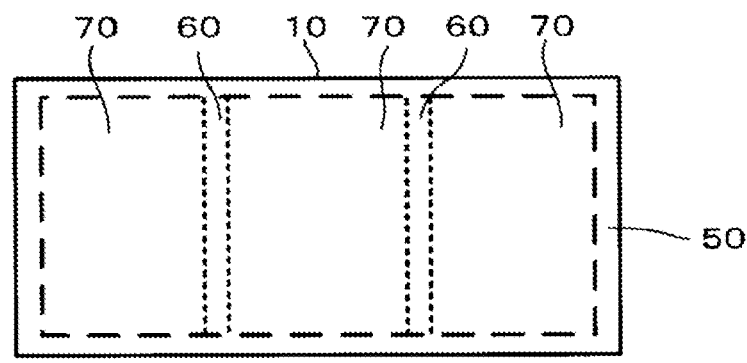
Figure 3C:
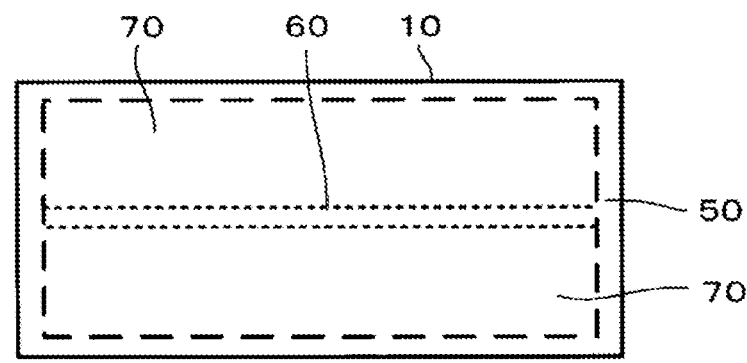
Figure 3D:
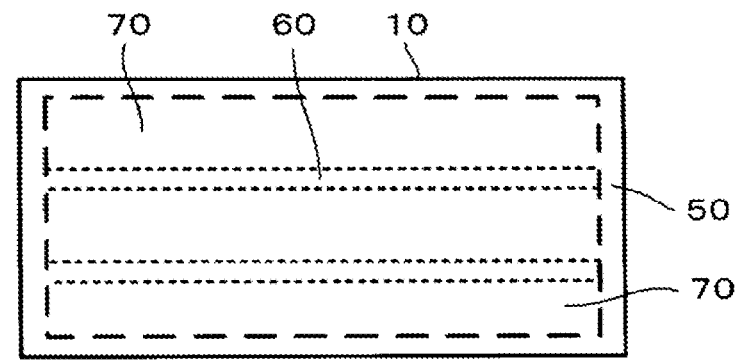
Figure 4A:
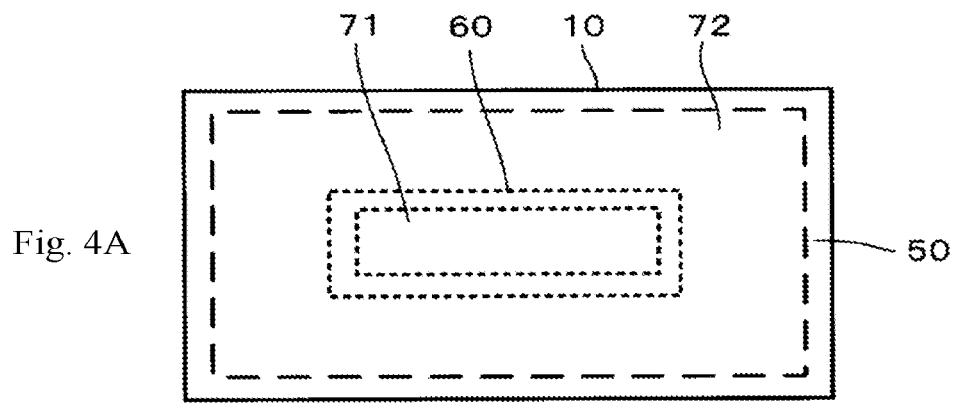
FIGS. 4A to 4D are plan views showing vibration areas of glass sheet composites according to the present invention.
Figure 4B:
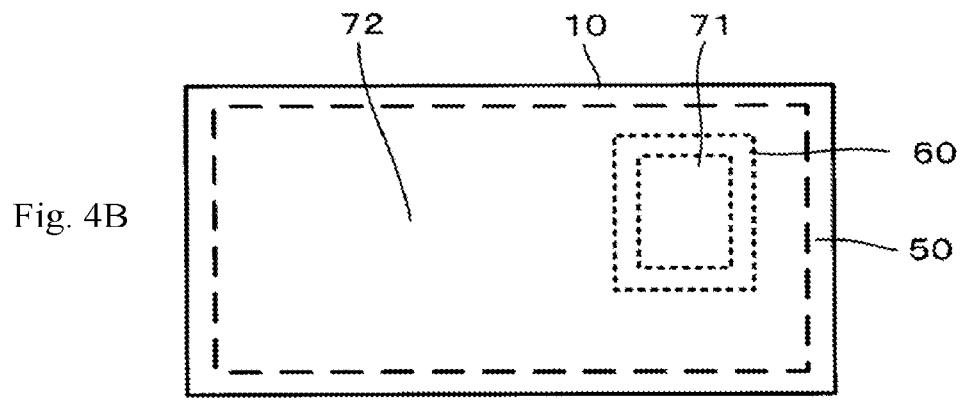
Figure 4C:
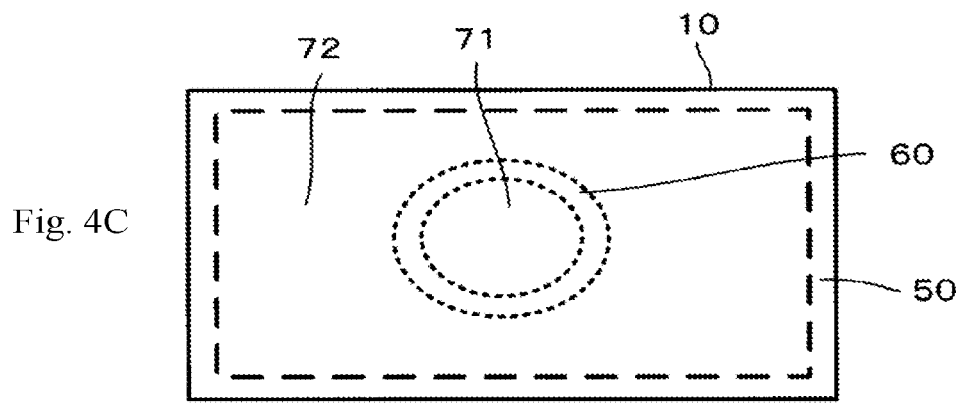
Figure 4D:
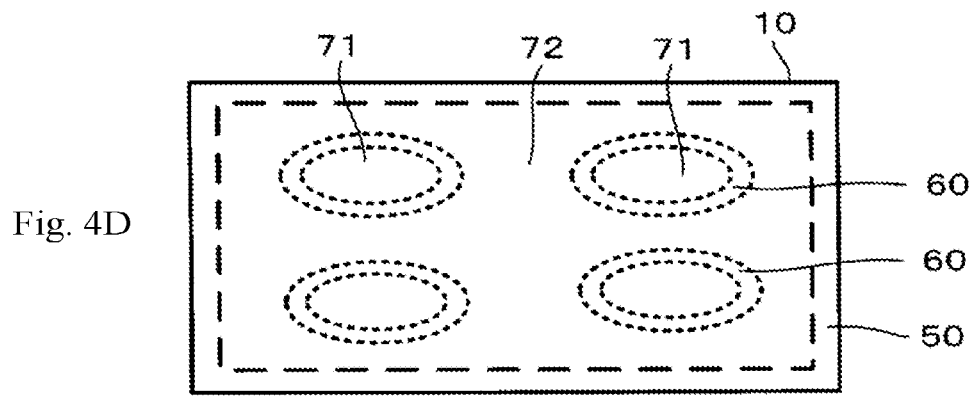

FIGS. 1A and 1B are cross-sectional views showing examples of glass sheet composites 10 of the present invention; FIG. 1A shows a first embodiment and FIG. 1B shows a second embodiment.

Each glass sheet composite 10 includes: a first glass sheet 20; a second sheet 30 disposed opposite the first glass sheet 20; a liquid layer 40 formed by sealing up a liquid between the first glass sheet 20 and the second sheet 30; a seal material 50 which prevents the liquid layer 40 from leaking out and bonds the first glass sheet 20 and the second sheet 30 to each other; one or more partitioning parts 60 which partition the liquid layer 40; and a plurality of vibration areas 70 which have been separated by the partitioning parts 60 and are capable of being vibrated independently of each other in a plan view.

The plurality of vibration areas 70 formed by dividing the liquid layer 40 can be vibrated independently of each other, making it possible to perform not only stereophonic or multiphonic sound reproduction but also local reproduction according to images. For example, a sound from a specific person or object in an image can be locally produced from the position thereof within the image.

It is preferable that the plurality of vibration areas 70 have area equal to each other. In cases when the vibration areas 70 have equal area, the sound sources for stereophonic reproduction or the like to be disposed on the right-hand/left-hand sides or on the upside/downside can be made the same and sounds of good quality can be reproduced. The plurality of vibration areas 70 may have different areas. This makes it possible to reproduce distinctive sounds according to specific sound sources or images.

The first glass sheet 20 has two opposed main surfaces (the surface facing the second sheet 30 is referred to as "main surface 21") and edge surfaces in edge portions 22. The second sheet 30 likewise has two opposed main surfaces (the surface facing the first glass sheet is referred to as "main surface 31") and edge surfaces in edge portions 32. The liquid layer 40, the seal material 50, and the partitioning parts 60 have been disposed between the first glass sheet 20 and the second sheet 30, and the seal material 50 has been disposed in the edge-surface-side of edge portions 22 and 32 so as to surround the liquid layer 40. Namely, the seal material 50 is provided to peripheral portions of the first glass sheet 20 and second sheet 30 which are portions extending from the edge surfaces of the edge portions 22 and 32 toward the centers of the main surfaces 21 and 31. The term "main surface" means a surface through which light for viewing is emitted.

The partitioning parts 60 have been disposed in the space defined by the seal material 50, and is either in the state of having been bonded to both the main surface 21 of the first glass sheet 20 and the main surface 31 of the second sheet 30 (first embodiment) or in the state of having been bonded to the main surface (21 or 31) of one of the two sheets and being slightly separated from the main surface (31 or 21) of the other sheet (second embodiment). The partitioning parts 60 may have been disposed in the space between the first glass sheet 20 and the second sheet 30 (partially) in a cross-sectional view. The partitioning parts 60 may be formed in accordance with only either of these embodiments, or may be formed in accordance with these embodiments in combination.

In the first embodiment, the liquid layers 40 in the vibration areas 70 have been formed at edges of the vibration areas 70, and have been hermetically sealed up by the partitioning parts 60, which define boundaries between the vibration areas 70.

By disposing the partitioning parts 60 so as to completely partition the liquid layer 40 without leaving any space, the vibration areas 70 can be clearly separated from each other and the individual vibration areas 70 can have enhanced independence in vibration. In addition, the bonded portions have an increased area, resulting in an improvement in the strength of adhesion between the first glass sheet 20 and the second sheet 30.

Methods for applying the seal material 50, the partitioning parts 60, and a liquid ingredient (liquid) for forming the liquid layer 40 are explained below.

(Seal Material, Partitioning Parts, Application)

For disposing a seal material 50, a dispenser is used to draw a line having a width of 0.5 mm at a distance of 1 mm from the edge surface, on the main surface 31 of a second sheet 30 having, for example, a length of 100 mm, a width of 100 mm, and a thickness of 0.5 mm. For forming a plurality of vibration areas 70, partitioning parts 60 are formed by drawing lines on the main surface 31 of the second sheet 30 in the same manner as for the seal material 50. The material of the partitioning parts 60 may be the same material as the seal material 50 or may be a material having a lower adhesion strength than the seal material 50.

(Application of Liquid Ingredient)

A liquid ingredient (oil ingredient) is applied with a disperser to a central portion (portion surrounded by the seal material 50) of the second sheet 30 to draw, for example, lines having a line width of 0.5 mm and a line spacing of 4 mm while leaving a 2-mm uncoated area between the applied liquid ingredient and the line of the applied seal material 50. With respect to the ejection amount of the liquid ingredient, the liquid ingredient is applied while controlling the mass thereof so that the liquid layer 40 to be formed through laminating has a thickness of 3 μm. For example, in the case where the region inside the line of the seal material 50 has a length of 100 mm and a width of 100 mm and a liquid ingredient having a density of 1 g/cm$^3$ is to be applied thereto in a thickness of 3 μm, the desired application may be attained by controlling the ejection mass so as to result in a total application amount of 0.03 g. In this procedure, either of the seal material 50 and the liquid ingredient for forming the liquid layer 40 may be applied first for line drawing.

A second sheet 30 having dimensions of 100 mm×100 mm×0.5 mm is prepared. A dimethyl silicone oil having a dynamic viscosity at 25° C. of 3,000 (mm$^2$/s) and a methyl phenyl silicone oil are evenly applied as liquid ingredients to the second sheet 30 using a dispenser (SHOTMASTER 400DS-s, manufactured by Musashi Engineering), while leaving an allowance having a width of 5 mm along the edge portions and the edges of the partitioning parts 60. Furthermore, a seal material (curable resin) 50 is applied in a line width of about 0.5 mm to the edge portions of the second sheet 30. The second sheet 30 and a first glass sheet 20 are laminated to each other, and thereafter the seal material 50 and the partitioning parts 60 are cured.

(Laminating Step)

The seal material 50, the partitioning parts 60, and the liquid ingredient are applied in the steps described above, and the second sheet 30 thus coated and a first glass sheet 20 which is uncoated and is equal in kind and size to the second sheet 30 are laminated to each other under a reduced pressure. In the reduced-pressure laminating, the pressure is preferably 1,500 Pa or less, more preferably 300 Pa or less, still more preferably 100 Pa or less, especially desirably 10 Pa or less. After the laminating, the seal material 50 is cured by UV irradiation, heating, etc. in accordance with the mode of curing of the seal material 50 used.

During the laminating, the liquid ingredient which has been applied inside spreads and comes into contact with the seal material 50 to apply force thereto from inside, and the seal material 50 spreads mainly outward. Although the seal material 50 spreads outward, the liquid ingredient does not leak out from the space between the first glass sheet 20 and the second sheet 30 because of surface tension exerted at the edge portions 22 and 32 of the first glass sheet 20 and second sheet 30. A liquid layer 40 is thereby formed, and a plurality of vibration areas 70 are formed.

In the explanation given above, the seal material 50, the partitioning parts 60, and the liquid ingredient for the liquid layer 40 were applied to the main surface 31 of a second sheet 30. However, the seal material 50, the partitioning parts 60, and the liquid ingredient may be applied to the main surface 21 of a first glass sheet 20.

Examples of the vibration areas 70 which can be vibrated independently of each other in a plan view are explained by reference to FIG. 2A to FIG. 6. The partitioning parts 60 may have a suitable shape according to the first embodiment or the second embodiment.

FIGS. 2A to 2D show examples each including vibration areas 70 formed by an equal division. Example 1 (FIG. 2A) includes two areas formed by a division in the right-hand/left-hand direction in a plan view; Example 2 (FIG. 2 B) includes four areas formed by a division in the upside/downside direction and right-hand/left-hand direction; Example 3 (FIG. 2C) includes six areas formed by a division in the upside/downside direction and right-hand/left-hand direction; and Example 4 (FIG. 2 D) includes eight areas formed by a division in the upside/downside direction and right-hand/left-hand direction. A plurality of vibration areas 70 can be formed by a division in accordance with sound sources or images. Vibrators 80 can be provided to the first glass sheet 20 or the second sheet 30. The same applies in the following Examples.

FIGS. 3A to 3D show divisions in the right-hand/left-hand direction or the upside/downside direction for multiphonic reproduction. Example 5 (FIG. 3 A) includes two areas formed by a division in the right-hand/left-hand direction; Example 6 (FIG. 3 B) includes three areas formed by a division in the right-hand/left-hand direction; Example 7 (FIG. 3 C) includes two areas formed by a division in the upside/downside direction; and Example 8 (FIG. 3 D) includes three areas formed by a division in the upside/downside direction. The vibration areas 70 formed by each division may have equal or different area. These divisions are suitable for, for example, diaphragms which require a plurality of channels.

FIG. 4A to 4D show examples of local divisions. Example 9 (FIG. 4 A) includes one vibration area 71 of an approximately rectangular shape in a central region and another vibration area 72, which surrounds the vibration area 71, with a partitioning part 60 serving as a boundary therebetween. Example 10 (FIG. 4 B) has a similar configuration but the vibration area 71 lies near edge portions 22 and 32. Example 11 (FIG. 4 C) includes a vibration area 71 having an approximately circular shape. Example 12 (FIG. 4 D) includes a plurality of central vibration areas 71. Shapes or numbers of such locally formed vibration areas 70 are not limited, and they can be selected in accordance with desired sound sources, etc.

Although configurations including one or more vibration areas 71 surrounded by another vibration area 72 were explained above, a vibration area 70 may be disposed like a spot and the area surrounding the vibration area 71 may be a solid material or a blank area (non-vibration area). Meanwhile, a vibration area 72 may be formed as an area surrounding a central portion, which may be a solid material or a blank area (non-vibration area).

Figure 5A:
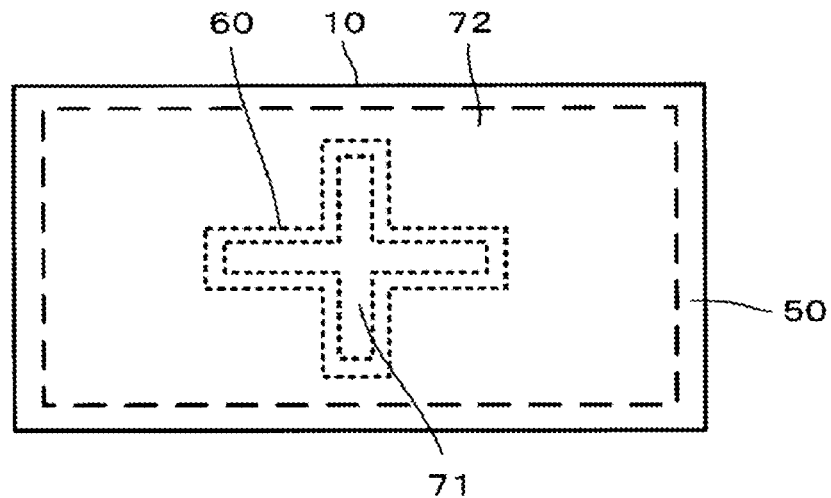
FIGS. 5A and 5B are plan views showing vibration areas of glass sheet composites according to the present invention.
Figure 5B:
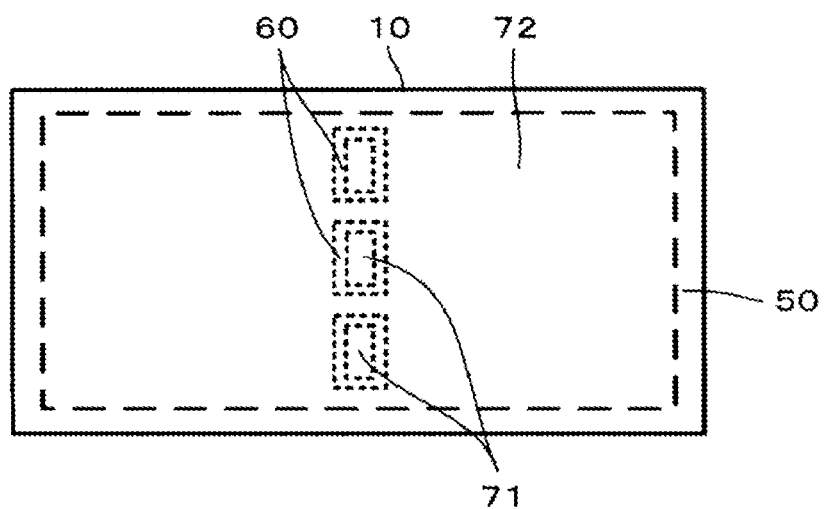

FIGS. 5A and 5B show examples of special shapes. Example 13 (FIG. 5 A) includes a vibration area 71 having a cross shape in a plan view. Example 14 (FIG. 5 B) includes a plurality of vibration areas 71 arranged serially. These special shapes are suitable for combinations of sound reproduction and images in specific regions.

Figure 6:
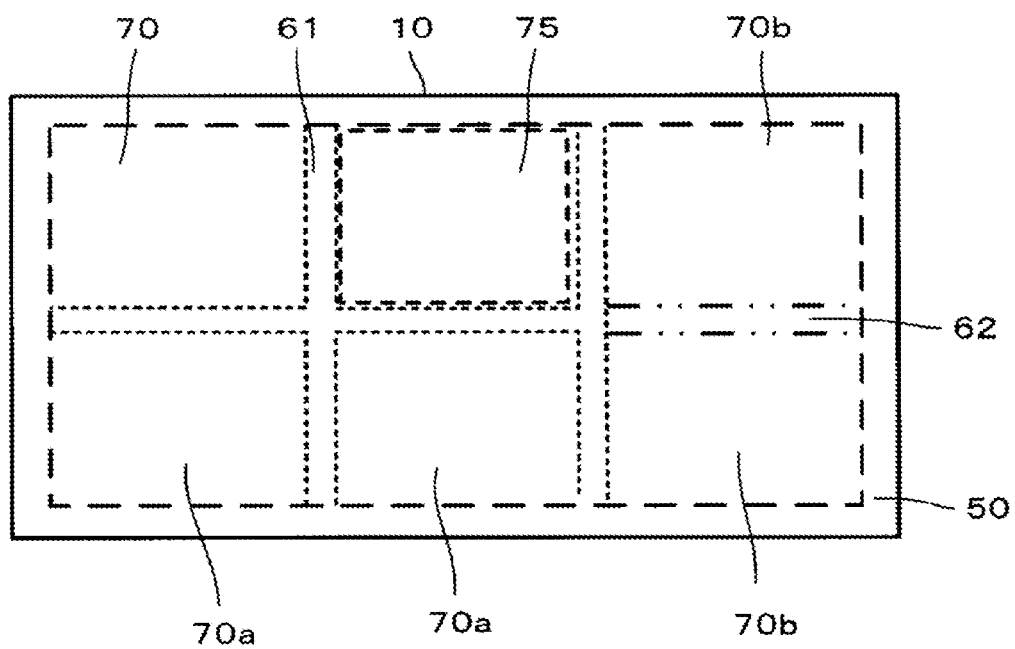
FIG. 6 is a plan view showing vibration areas of the glass sheet composite of Example 15 according to the present invention.

FIG. 6 shows a combination of vibration areas 70 and a non-vibration area 75. Example 15 (FIG. 6) includes a plurality of vibration areas 70 and a non-vibration area 75 formed by partially disposing, for example, a solid material. Partitioning parts 61 according to the first embodiment and a partitioning part 62 according to the second embodiment are employed for separating vibration areas 70, and thus the vibration areas 70 are made to separately include adjacent vibration areas 70 in which the liquids in the liquid layers 40 are separated from each other and adjacent vibration areas 70 in which the liquids in the liquid layers 40 are in contact with each other in a flowable state.

Example 15 is an example including independent vibration areas 70a and vibration areas 70b in which the liquids are flowable. In the vibration areas 70b, the liquids in the liquid layers 40 do not completely mingle with each other and lie in the respective fixed positions while being kept in the state of being separated from each other to some degree. This configuration is not limited to Example 15, and the embodiments of the partitioning parts 60 in the Examples given above also can be selected in accordance with the intended sound reproduction. By changing the ingredient of the liquids in the liquid layers 40, the liquid separation between the vibration areas 70b can be maintained.

The results of a test of Comparative Example and Test Examples are explained below by reference to the table given in FIG. 7.

Glass sheet composites 10 having a given size (e.g., 55 inches; thickness, 1.1 mm) were produced as shown in the table. Comparative Example was a single glass sheet (55 inches; thickness, 1.1 mm); Test Example 1 was a glass sheet composite (having a liquid layer between two 55-inch glass sheets having a thickness of 1.1 mm) in which the liquid layer had been divided into two by a partitioning part 60 so as to result in vibration areas having equal area; and Test Example 2 was a glass sheet composite (having the same configuration as Test Example 1) in which the liquid layer had been divided into eight by partitioning parts 60 so as to result in vibration areas having equal area. The "LR mode reproduction" is a mode of reproduction in which different vibrations are caused respectively by two vibrators. In Test Example 1, one vibrator was disposed at the center of each of the two vibration areas to perform LR mode reproduction. In Comparative Example, vibrators were disposed in the same positions as in Test Example 1 to perform LR mode reproduction. In Test Example 2, one vibrator was disposed at the center of any one of the four left-hand-side vibration areas among the eight vibration areas, one vibrator was disposed at the center of any one of the four right-hand-side vibration areas, and LR mode reproduction was performed. Sweep sounds and a music were produced to examine each diaphragm for reproduction performance. The diaphragm which was able to perform excellent reproduction was rated as "excellent", that which was able to perform satisfactory reproduction was rated as "good", and that which had difficulty in performing satisfactory reproduction was rated as "poor".

The present invention is not limited to the embodiments described above, and modifications, improvements, etc. can be suitable made therein. The constituent elements in the embodiments are each not limited in the material, shape, dimensions, numerical values, form, number, place of disposition, etc. thereof so long as the present invention can be achieved.

The present invention is based on a Japanese patent application filed on Oct. 4, 2017 (Application No. 2017-194639), the contents thereof being incorporated herein by reference.

INDUSTRIAL APPLICABILITY

The glass sheet composite of the present invention includes a plurality of vibration areas and is hence suitable for use in fields where stereophonic reproduction, local reproduction, or the like is required. The glass sheet composite of the invention is suitable also for diaphragms for use in loudspeakers, microphones, earphones, mobile devices, etc.

REFERENCE SIGNS LIST

10 Glass sheet composite
20 First glass sheet
30 Second sheet
40 Liquid layer
50 Seal material
60 Partitioning part
70 Vibration area
80 Vibrator

The invention claimed is:

1. A glass sheet composite comprising
a first glass sheet,
a second sheet disposed opposite the first glass sheet, and
a liquid layer formed by sealing up a liquid between the first glass sheet and the second sheet,
wherein the glass sheet composite has a plurality of vibration areas that are independent of each other in a plan view, and
wherein the liquids of the liquid layers in the vibration areas have been hermetically sealed up by partitioning parts that are formed at edges of the vibration areas, and define boundaries between the vibration areas.

2. The glass sheet composite according to claim 1, wherein the plurality of vibration areas have area equal to each other.

3. The glass sheet composite according to claim 1, wherein the first glass sheet and the second sheet have been fixed to each other, with a seal material interposed therebetween, the partition parts being made of the same material as the seal material.

4. The glass sheet composite according to claim 1, wherein the first glass sheet and the second sheet have been fixed to each other, with a seal material interposed therebetween, the partition parts being made of a material having a lower adhesion strength than the seal material.

5. The glass sheet composite according to claim 4, wherein a difference in refractive index between the liquid layer and the seal material including the partitioning parts is 0.015 or less.

6. The glass sheet composite according to claim 1, wherein the liquid of the liquid layer in at least two of the vibration areas have different ingredient from each other.

7. A diaphragm comprising the glass sheet composite according to claim 1 and at least one vibrator disposed on one or both surfaces of the glass sheet composite.

8. A glass sheet composite comprising
a first glass sheet,
a second sheet disposed opposite the first glass sheet, and
a liquid layer formed by sealing up a liquid between the first glass sheet and the second sheet,
wherein the glass sheet composite has a plurality of vibration areas that are independent of each other in a plan view, and
wherein the liquid of the liquid layer in one of at least two adjacent vibration areas among said vibration areas and the liquid of the liquid layer in the other of the two adjacent vibration areas are in contact with each other in the partitioning part which defines a boundary between the two vibration areas, in a state of being mutually flowable.

9. The glass sheet composite according to claim 8, wherein the plurality of vibration areas have area equal to each other.

10. The glass sheet composite according to claim 8, wherein the first glass sheet and the second sheet have been fixed to each other, with a seal material interposed therebetween, the partition parts being made of a material having a lower adhesion strength than the seal material.

11. The glass sheet composite according to claim 10, wherein a difference in refractive index between the liquid layer and the seal material including the partitioning parts is 0.015 or less.

12. The glass sheet composite according to claim 8, wherein the liquid of the liquid layer in at least two of the vibration areas have different ingredient from each other.

13. A diaphragm comprising the glass sheet composite according to claim 8 and at least one vibrator disposed on one or both surfaces of the glass sheet composite.

14. A glass sheet composite comprising
a first glass sheet,
a second sheet disposed opposite the first glass sheet, and
a liquid layer formed by sealing up a liquid between the first glass sheet and the second sheet,
wherein the glass sheet composite has a plurality of vibration areas that are independent of each other in a plan view, and
wherein the liquid of the liquid layer in at least two of the vibration areas have different ingredient from each other.

15. The glass sheet composite according to claim 14, wherein the plurality of vibration areas have area equal to each other.

16. The glass sheet composite according to claim 14,
wherein the liquids of the liquid layers in the vibration areas have been hermetically sealed up by partitioning parts that are formed at edges of the vibration areas, and define boundaries between the vibration areas, and
wherein the first glass sheet and the second sheet have been fixed to each other, with a seal material interposed therebetween, the partition parts being made of a material having a lower adhesion strength than the seal material.

17. The glass sheet composite according to claim 16, wherein a difference in refractive index between the liquid layer and the seal material including the partitioning parts is 0.015 or less.

18. A diaphragm comprising the glass sheet composite according to claim 14 and at least one vibrator disposed on one or both surfaces of the glass sheet composite.

* * * * *